United States Patent
Onuma et al.

(10) Patent No.: US 12,370,883 B2
(45) Date of Patent: Jul. 29, 2025

(54) CAPLESS FILLER

(71) Applicant: SUBARU CORPORATION, Tokyo (JP)

(72) Inventors: Hiroaki Onuma, Tokyo (JP); Yukiko Narimatsu, Tokyo (JP); Hideaki Hatakenaka, Tokyo (JP); Tsukasa Sato, Tokyo (JP); Kazuyuki Saiki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 73 days.

(21) Appl. No.: 18/382,670

(22) Filed: Oct. 23, 2023

(65) Prior Publication Data
US 2024/0140193 A1 May 2, 2024

(30) Foreign Application Priority Data
Nov. 2, 2022 (JP) ................................ 2022-176689

(51) Int. Cl.
*B60K 15/04* (2006.01)

(52) U.S. Cl.
CPC ...... *B60K 15/04* (2013.01); *B60K 2015/0461* (2013.01)

(58) Field of Classification Search
CPC .................... B60K 15/0429; B60K 15/0461

USPC .......................................... 141/350; 222/86.2
See application file for complete search history.

(56) References Cited

U.S. PATENT DOCUMENTS

| 9,340,105 B2 * | 5/2016 | Hagano ............... B60K 15/0406 |
| 10,226,996 B2 * | 3/2019 | Giles ....................... B60K 15/04 |
| 11,052,755 B2 * | 7/2021 | Stancu ............... B60K 15/0406 |

FOREIGN PATENT DOCUMENTS

JP 2012-180043 A 9/2012

* cited by examiner

*Primary Examiner* — Timothy L Maust
(74) *Attorney, Agent, or Firm* — TROUTMAN PEPPER LOCKE LLP

(57) ABSTRACT

A capless filler includes a housing, a flap, and a biasing spring. The housing has a fuel hole. The flap includes a supported part, a base, and a protrusion. The supported part is provided at an end part and is supported by the housing. The base extends to the supported part. The protrusion protrudes from the base. The flap is turned on a fulcrum at the supported part between open and closed positions. The biasing spring biases the flap in a direction from the open position to the closed position. The biasing spring pushes the base against an opening rim of the fuel hole at the closed position. The flap is turned in a direction from the closed position to the open position in response to the protrusion being pushed. At least a part of the protrusion is provided as a nozzle guide.

6 Claims, 8 Drawing Sheets

CAPLESS FILLER

CROSS-REFERENCE TO RELATED APPLICATION

The present application claims priority from Japanese Patent Application No. 2022-176689 filed on Nov. 2, 2022, the entire contents of which are hereby incorporated by reference.

BACKGROUND

The disclosure relates to a technical field related to capless fillers of vehicles, such as automobiles.

Some of vehicles, such as automobiles, are provided with a capless filler having a flap that is turned to open and close a fuel hole (for example, refer to Japanese Unexamined Patent Application Publication (JP-A) No. 2012-180043. In such a capless filler, an outer circumferential part of a flap is pushed against an opening rim of a fuel hole by a biasing force of a biasing spring, whereby the fuel hole is tightly closed, and mud, dust, waterdrops, etc., are prevented from entering a fuel tank from the fuel hole. In a capless filler as described above, a fueling person who fuels a vehicle pushes a flap by a fuel nozzle to turn the flap against a biasing force of a biasing spring, thereby opening a fuel hole.

SUMMARY

An aspect of the disclosure provides a capless filler. The capless filler includes a housing, a flap, and a biasing spring. The housing has a fuel hole into which a fuel nozzle is to be inserted. The flap includes a supported part, a base, and a protrusion. The supported part is provided at an end part and is supported by the housing. The base extends to the supported part. The protrusion protrudes from the base. The flap is configured to be turned on a fulcrum at the supported part between an open position for opening the fuel hole and a closed position for closing the fuel hole. The biasing spring is configured to bias the flap in a direction from the open position to the closed position. The biasing spring is configured to push the base against an opening rim of the fuel hole at the closed position. The flap is configured to be turned in a direction from the closed position to the open position in response to the protrusion being pushed by the fuel nozzle. At least a part of the protrusion is provided as a nozzle guide configured to guide the fuel nozzle in a direction away from the supported part when the flap is turned.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

In order to ensure high sealing performance of a fuel hole of a capless filler, a flap is pushed against an opening rim of the fuel hole by a great force. However, in the state in which a biasing force of a biasing spring is large, a great power is used to turn a flap in fueling, which may increase the work load of a fueling person.

On the other hand, JP-A No. 2012-180043 discloses a capless filler having a lock mechanism for locking a flap that is closing a fuel hole. Providing such a lock mechanism can improve sealing performance of a fuel hole without increasing a biasing force of a biasing spring, but a capless filler may have a complicated structure.

In view of these circumstances, it is desirable to reduce the work load of a fueling person by using a simple structure.

Hereinafter, embodiments for implementing a capless filler of the disclosure will be described with reference to the attached drawings (FIGS. 1 to 14). Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A capless filler has a fuel hole that opens to a side of a vehicle, and in the following description, a front-rear direction, an up-down direction, and a right-left direction are shown by assuming that an advancing direction of the vehicle is a front direction. It is noted that the directions of the front-rear direction, the up-down direction, and the right-left direction shown hereinafter are described for convenience of explanation, and the directions are not limited thereto when the disclosure is implemented.

First, a structure of a capless filler 1 of the first embodiment will be described (refer to FIGS. 1 to 3).

Figure 1:
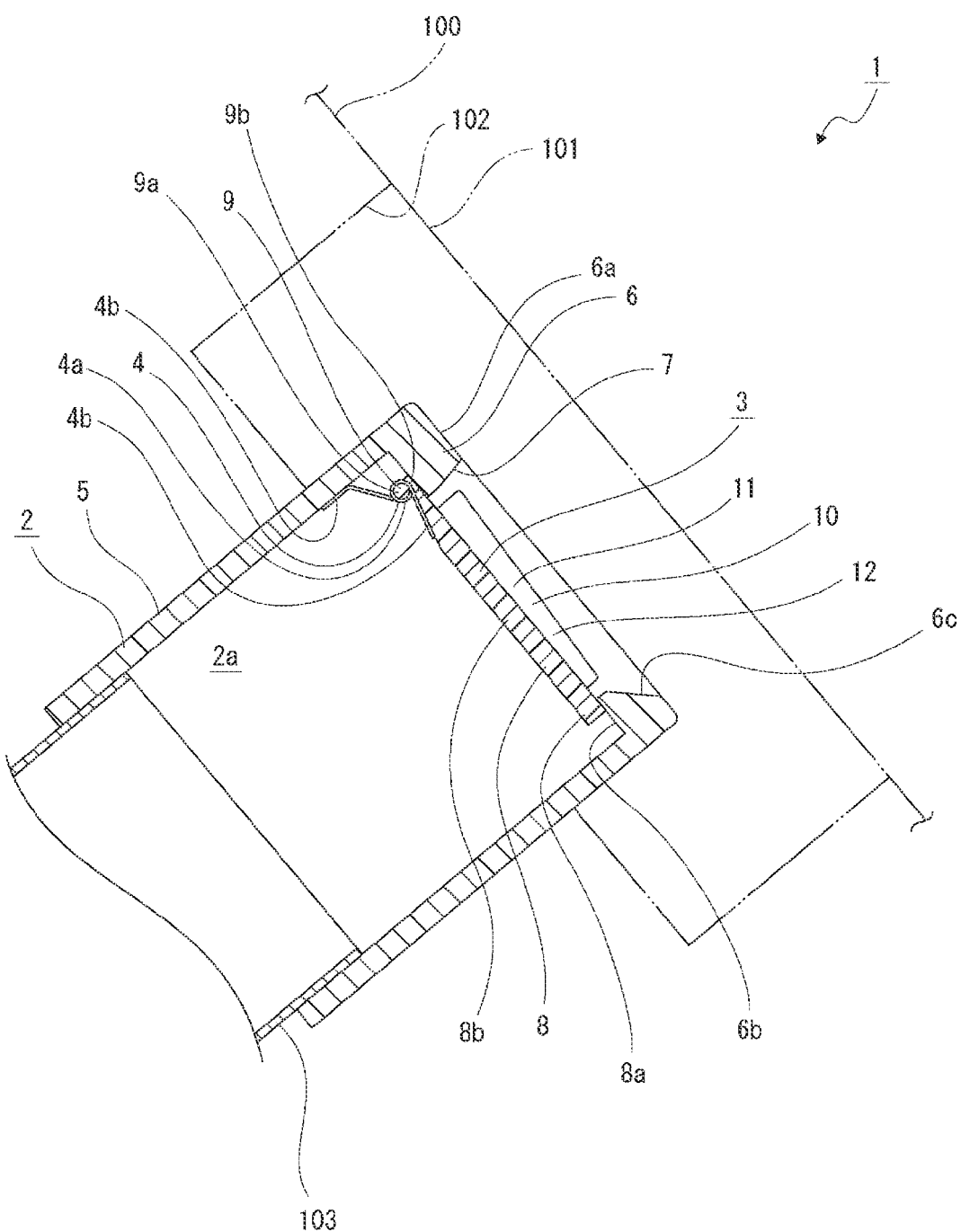
FIG. 1 is a sectional view of an embodiment of a capless filler of the disclosure, which is also illustrated in FIGS. 2 to 5.

A body 100 of a vehicle has a fuel recess 102 that opens to a side of the vehicle and that can be opened and closed by a cover 101 (refer to FIG. 1). The capless filler 1 is formed into a shape having an axial direction, as a whole, and for example, an end in the axial direction is in the fuel recess 102.

The capless filler 1 includes a housing 2, a flap 3, and a biasing spring 4.

The housing 2 includes a cylindrical-shaped cylinder 5 and a ring-shaped annular part 6 that extends to an end in the axial direction of the cylinder 5. The housing 2 is formed of a resin material, for example. The other end in the axial direction of the cylinder 5 is coupled to a filler pipe 103 that communicates with a fuel tank (not illustrated). The annular part 6 has an inside space as a fuel hole 7. The annular part 6 has an inner circumferential surface formed with a tapered surface 6c that is inclined such that the diameter decreases from an outside surface 6a toward an inside surface 6b in a thickness direction.

The housing 2 has an internal space as an insertion space 2a.

The flap 3 includes a base 8, a supported part 9, and protrusions 10. The flap 3 is formed of a resin material, for example. The whole flap 3 is positioned inside the housing 2.

The base 8 is formed into a disc shape in which the thickness direction coincides with the axial direction of the housing 2, and an outer circumferential part 8a is disposed in contact with the inside surface 6b of the annular part 6 of the housing 2, in the insertion space 2a. The part on a radially inward side of the outer circumferential part 8a of the base 8 is provided as a closure 8b.

The supported part 9 extends to an upper end part of the outer circumferential part 8a of the base 8. The supported part 9 includes a shaft part 9a having the axial direction which is approximately parallel to the front-rear direction, and a part between the shaft part 9a and the base 8 is provided as a continuous part 9b. The whole supported part 9 is positioned in the insertion space 2a, and the shaft part 9a is turnably supported by the housing 2, for example, at an inner side of an upper end part of the annular part 6. Thus, the flap 3 is turnable relative to the housing 2 on a fulcrum at the supported part 9.

Figure 2:
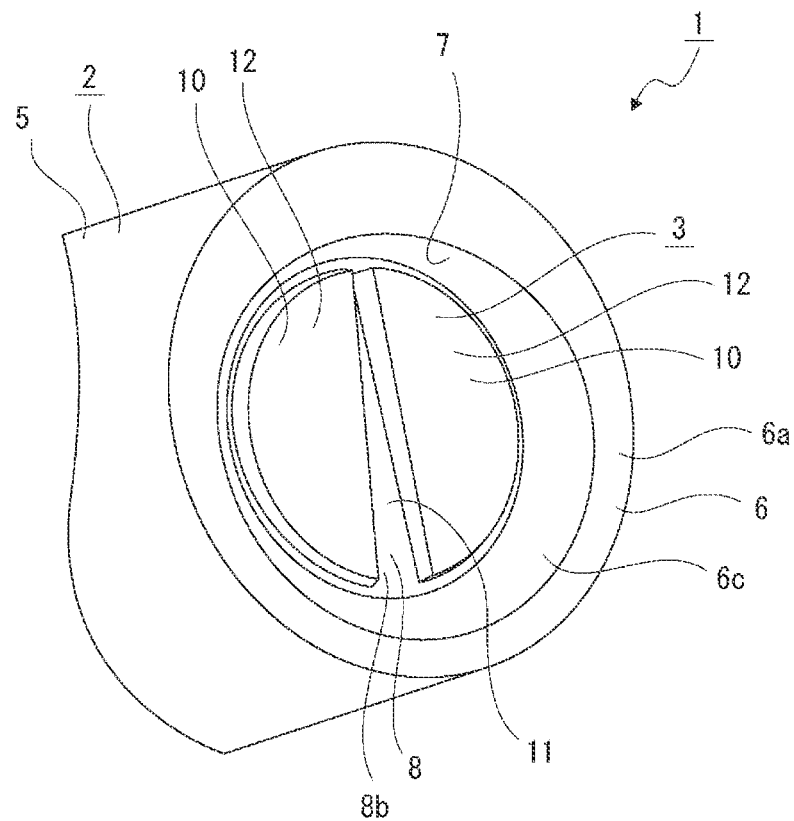
FIG. 2 is a perspective view of the capless filler.
Figure 3:
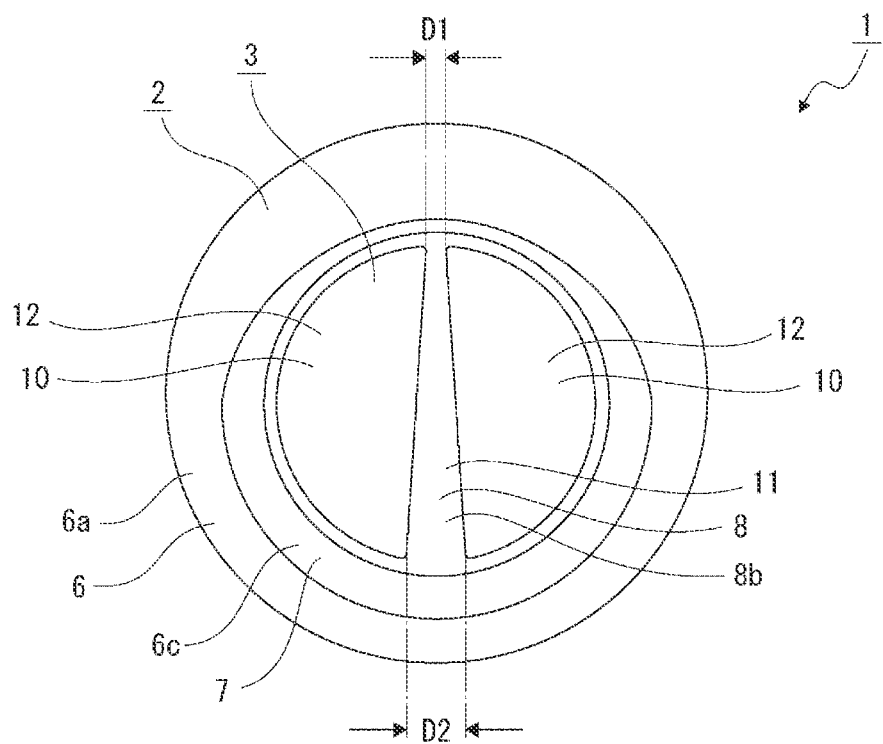
FIG. 3 is a front view of the capless filler.

Two protrusions 10 are provided separately from each other in the front-rear direction and protrude outward from parts other than the center in the front-rear direction of the closure 8b (refer to FIGS. 2 and 3). The part between the two protrusions 10 is a limiting groove 11, and the two protrusions 10 are formed into shapes symmetric relative to the limiting groove 11, for example.

The protrusion 10 may protrude from the whole closure 8b. In this case, the limiting groove 11 is formed by making a protrusion amount of the protrusion 10 at the center in the front-rear direction smaller than that on each side in the front-rear direction.

The two protrusions 10 are provided as nozzle guides 12 that are inclined such that the protrusion amounts of the protrusions 10 from the base 8 decrease downward a direction away from the supported part 9. The two nozzle guides 12 have a distance D1 between their upper ends, which is smaller than a distance D2 between their lower ends (refer to FIG. 3). Thus, the limiting groove 11 is formed into a shape in which the width increases downward.

The biasing spring 4 is, for example, a torsion coil spring, and it includes a coil 4a and a pair of arms 4b that extend to the coil 4a. The biasing spring 4 is supported at the coil 4a by the shaft part 9a of the supported part 9. One of the arms 4b is engaged with an inner circumferential surface of the cylinder 5 of the housing 2, whereas the other arm 4b is engaged with an upper end part of the closure 8b of the base 8 of the flap 3.

The flap 3 is pushed against an inside opening rim of the fuel hole 7 at the outer circumferential part 8a of the base 8 by a biasing force of the biasing spring 4, and it thereby closes the fuel hole 7. For the flap 3, a position for closing the fuel hole 7 is a closed position, and a predetermined position for opening the fuel hole 7 is an open position. When the flap 3 is at the closed position, the two protrusions 10 are positioned in the fuel hole 7.

Next, movement of the capless filler 1 of the first embodiment in fueling will be described (refer to FIGS. 4 and 5).

The following describes a direction in which the flap 3 is turned from the closed position to the open position, as a first direction, and also describes a direction in which the flap 3 is turned from the open position to the closed position, as a second direction. In addition, a moment of a force in the first direction relative to the shaft part 9a of the flap 3 is represented as a moment "M".

In the state prior to fueling, the flap 3 is pushed against the inside opening rim of the fuel hole 7 by the biasing force of the biasing spring 4 and closes the fuel hole 7.

Figure 4:
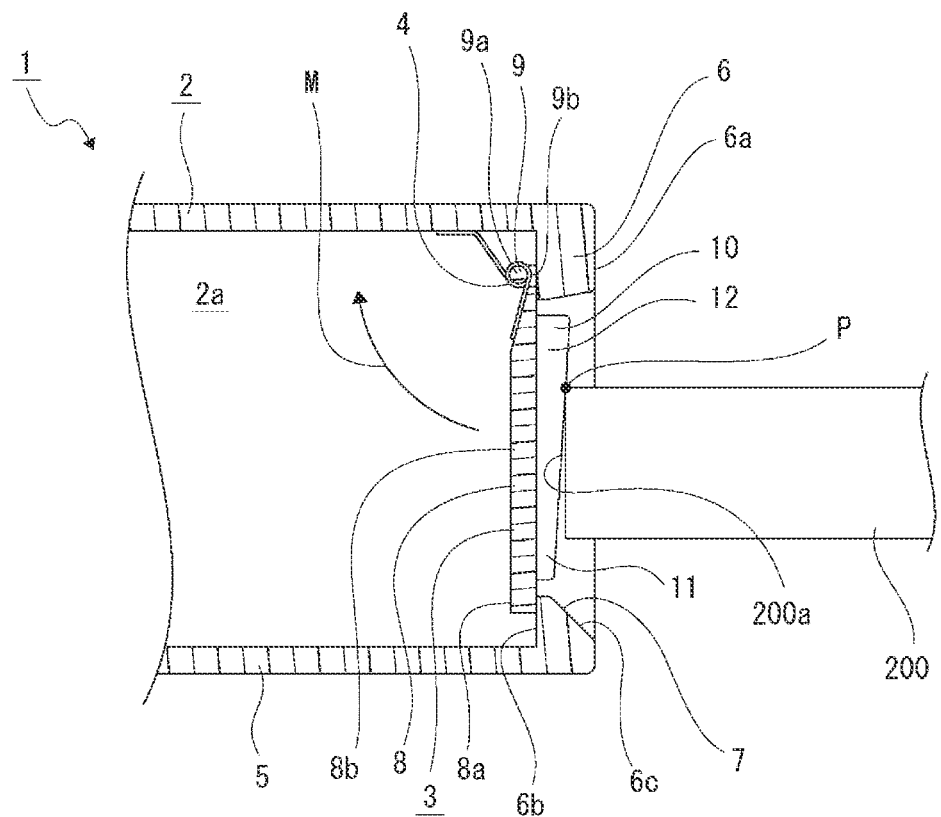
FIG. 4 is a sectional view illustrating a flap at a closed position.

In fueling, at least a part of a head 200a of a fuel nozzle 200 comes into contact with the protrusions 10 (nozzle guides 12), and the protrusions 10 are pushed by the fuel nozzle 200 to generate a moment "M" in the flap 3 (refer to FIG. 4). When the fuel nozzle 200 is pressed against the annular part 6 without coming into contact with the protrusions 10, the tapered surface 6c guides the fuel nozzle 200 to a position for coming into contact with the protrusions 10. Thus, it is possible to reliably push the protrusions 10 by the fuel nozzle 200, which enhances convenience of a fueling person.

When the protrusions 10 are pushed by the fuel nozzle 200 in starting fueling, the moment "M" that is generated in the flap 3 may be equal to or less than the biasing force of the biasing spring 4. In this case, the flap 3 is not turned from the closed position and continuously closes the fuel hole 7 (refer to FIG. 4).

On the other hand, when the protrusions 10 are pushed by the fuel nozzle 200 in starting fueling, the moment "M" that is generated in the flap 3 may be greater than the biasing force of the biasing spring 4. In this case, the flap 3 is turned from the closed position to the open position. In accordance with this turning of the flap 3, an upper end part or a part close to the upper end of the fuel nozzle 200 comes into contact with the protrusions 10.

In each of the above-described cases, as the protrusions 10 are pushed by the fuel nozzle 200, the flap 3 is turned to the open position.

At this time, assuming that a contact position of the fuel nozzle 200 to the protrusion 10 is represented as a pushing position "P", the fuel nozzle 200 is guided downward by the nozzle guides 12 while sliding thereon, and the pushing position "P" moves in a direction away from the supported part 9.

As the pushing position "P" moves, the distance between the pushing position "P" and the supported part 9 (shaft part 9a) increases, and the moment "M" increases gradually. Thus, a fueling person can turn the flap 3 to the open position without increasing a pushing force of the fuel nozzle 200.

Figure 5:
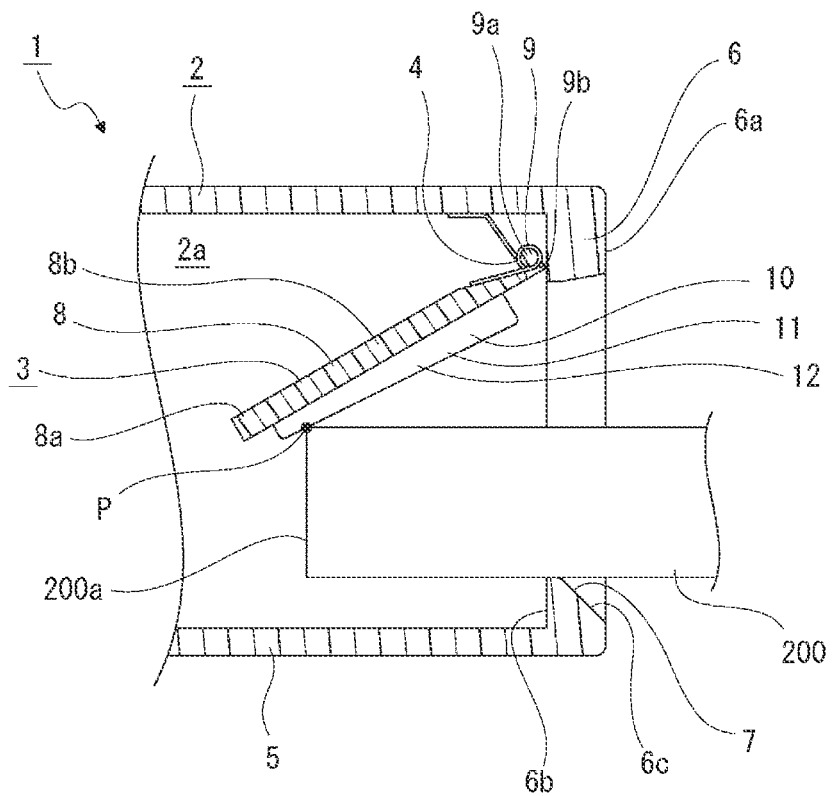
FIG. 5 is a sectional view illustrating the flap that is turned from the closed position to an open position.

As the flap 3 is turned in the first direction to open the fuel hole 7, the fuel nozzle 200 is inserted into the insertion space 2a (refer to FIG. 5).

At this time, as the amount of inserting the fuel nozzle 200 into the insertion space 2a increases while the fuel nozzle 200 is guided by the nozzle guides 12, the pushing position "P" is separated from the supported part 9, whereby the flap 3 can be turned in the first direction by a smaller force.

When the flap 3 is turned in the first direction as described above, the upper end part or the part close to the upper end of the fuel nozzle 200 is inserted in the limiting groove 11. This makes the fuel nozzle 200 be in contact with both of the two nozzle guides 12 at opening edges of the limiting groove 11 and thereby limits movement of the fuel nozzle 200 in a direction in which the two protrusions 10 are arranged. Thus, the fuel nozzle 200 is guided in the direction away from the supported part 9 by the nozzle guides 12, while being limited by the limiting groove 11 in movement in the direction in which the two protrusions 10 are arranged.

As described above, in the capless filler 1, a part distant from the supported part 9 of the flap 3 tends to be pushed by the fuel nozzle 200 when the flap 3 is turned in response to the nozzle guides 12 being pushed by the fuel nozzle 200.

Thus, the flap 3 can be turned in the first direction against the biasing force of the biasing spring 4 by a small force. This simple structure makes it possible to reduce the work load of a fueling person.

The limiting groove 11 is defined between the two nozzle guides 12, which are provided separately from each other in the front-rear direction. The limiting groove 11 limits movement of the fuel nozzle 200 in the front-rear direction. Thus, the limiting groove 11 makes it easy for the fuel nozzle 200 to continuously move at positions in contact with both of the two nozzle guides 12, and the fuel nozzle 200 can be stably and reliably guided by the nozzle guides 12.

The limiting groove 11 is formed into a shape in which the width increases downward. Thus, a distance between points of contact of the fuel nozzle 200 with the two nozzle guides 12 increases as the fuel nozzle 200 moves downward, whereby the fuel nozzle 200 can be more stably and reliably guided in the direction of being guided by the nozzle guides 12.

Next, a capless filler 1X of the second embodiment will be described (refer to FIGS. 6 to 9).

The capless filler 1X described below differs from the above-described capless filler 1 in the shape of the protrusion of the flap. In consideration of this, the parts different from those of the capless filler 1 will be described in detail. The other parts are denoted by the same reference symbols as those used for equivalent components of the capless filler 1, and descriptions thereof are omitted.

Figure 6:
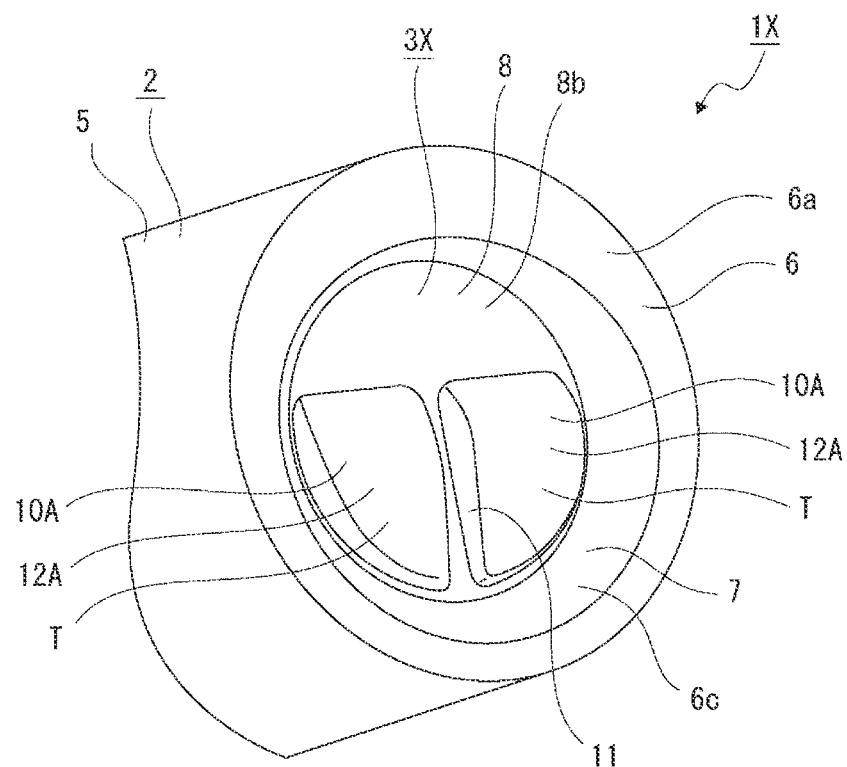
FIG. 6 is a perspective view of an embodiment of the capless filler of the disclosure, which is also illustrated in FIGS. 7 to 9.
Figure 7:
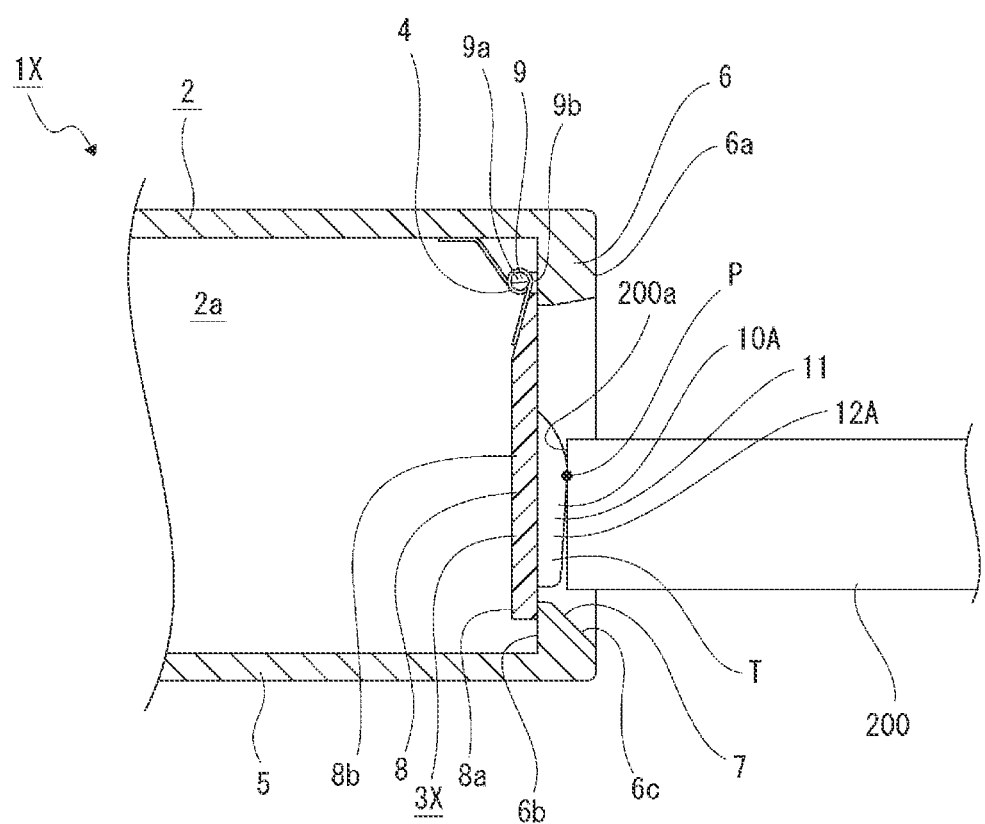
FIG. 7 is a sectional view of the capless filler in FIG. 6.

A flap 3X of the capless filler 1X is provided with protrusions 10A (refer to FIG. 6). Two protrusions 10A are provided separately from each other in the front-rear direction and protrude outward from parts other than (i) an upper end part of the closure 8b and (ii) the center of the closure 8b in the front-rear direction. The part between the two protrusions 10A is the limiting groove 11, and the two protrusions 10A are formed into shapes symmetric relative to the limiting groove 11, for example.

The protrusion 10A has a gently curved outer surface and an upper end part the protrusion amount of which from the base 8 decreases upward. The part other than the upper end part of the protrusion 10A is provided as a nozzle guide 12A having an outer surface that is inclined such that the protrusion amount of the outer surface from the base 8 decreases downward, that is, toward the direction away from the supported part 9.

In the flap 3X, the protrusion 10A does not protrude from the upper end part of the closure 8b, and the area of the closure 8b that can be viewed is increased, whereby the protrusion part is emphasized so that the protrusion 10A can draw more attention. The protrusion 10A, which is thus emphasized in the flap 3X, is easily perceived by a fueling person, as a part to be pushed by the fuel nozzle 200, and the protrusion 10A is used as a target "T" that shows the pushing position "P" of the fuel nozzle 200.

In the capless filler 1X, the nozzle guide 12A is provided as the target "T", whereby the pushing position "P" is clearly shown. Thus, a fueling person can easily push the protrusion 10A by the fuel nozzle 200 while aiming the target "T", in fueling. In addition, a position distant from the supported part 9 tends to be pushed in starting fueling (refer to FIG. 7). This decreases the distance in which the nozzle guide 12A guides the fuel nozzle 200, resulting in reduction in operation time in fueling. The protrusion 10A, which has the gently curved outer surface at the upper end part, makes the fuel nozzle 200 easily come over the protrusion 10A when the fuel nozzle 200 pushes a part on an upper side of the target "T" in starting fueling. Thus, the possibility of avoiding pushing the part on an upper side of the target "T" is increased, and the possibility in which the fuel nozzle 200 pushes the protrusion 10A is enhanced, in fueling.

Figure 8:
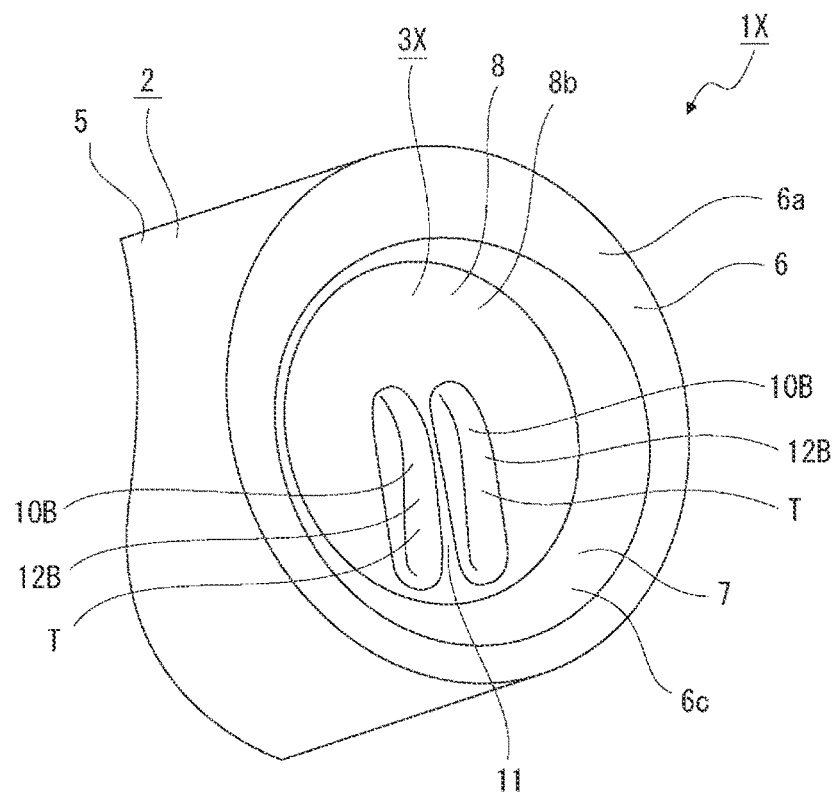
FIG. 8 is a perspective view illustrating an example of a capless filler having a protrusion with a shape different from that illustrated in FIG. 6.

The capless filler 1X may be provided with, instead of the two protrusions 10A, two protrusions 10B that include parts, simply on the limiting groove 11 side, of the protrusions 10A (refer to FIG. 8). The two protrusions 10B each have an elongated shape extending approximately in the upper-lower direction and are formed into shapes symmetric relative to the limiting groove 11, for example.

Each of the two protrusions 10B has a gently curved outer surface and an upper end part the protrusion amount of which from the base 8 decreases upward. The part other than the upper end part of the protrusion 10B is provided as a nozzle guide 12B having an outer surface that is inclined such that the protrusion amount thereof from the base 8 decreases downward, that is, toward the direction away from the supported part 9.

The protrusion 10B (nozzle guide 12B) is also used as the target "T" due to the same reason as for the protrusion 10A.

As in the case of using the protrusions 10A, using the protrusions 10B instead of the protrusions 10A enables a fueling person to easily push the protrusions 10B by the fuel nozzle 200 while aiming the target "T" in fueling and to easily push a position distant from the supported part 9 in starting fueling. Thus, operation time in fueling can be reduced. Moreover, the protrusion 10B, which has the gently curved outer surface at the upper end part, makes the fuel nozzle 200 easily come over the protrusions 10B when the fuel nozzle 200 pushes parts on an upper side of the target "T". Thus, the possibility in which the fuel nozzle 200 pushes the protrusions 10B is enhanced.

The protrusion part of the protrusion 10B from the closure 8b is small, whereby the pushing position "P" of the flap 3X is more clearly shown, and material cost of the flap 3X is small, which makes it possible to reduce manufacturing cost of the flap 3X.

Figure 9:
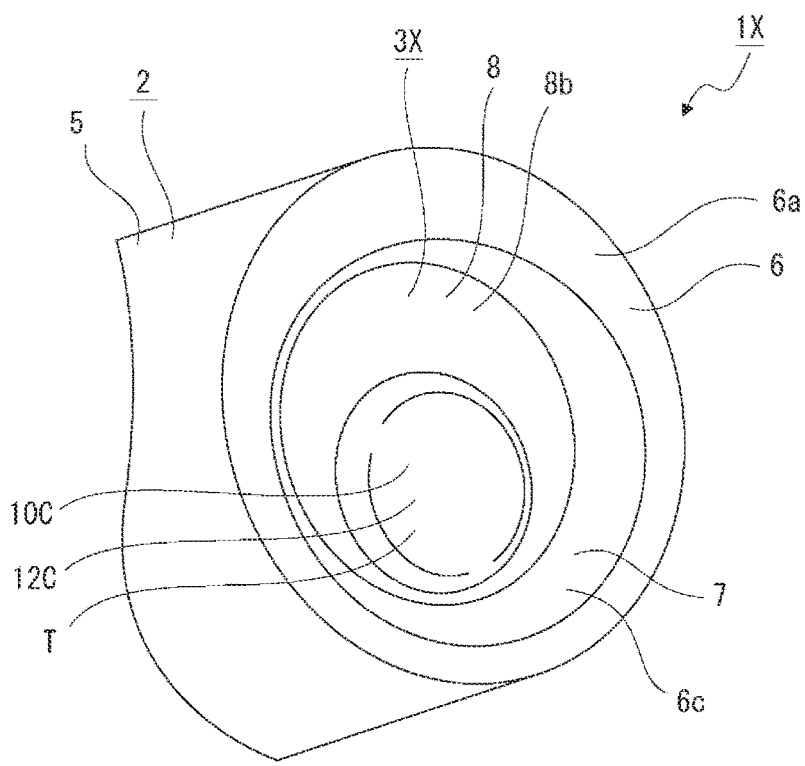
FIG. 9 is a perspective view illustrating another example of the capless filler having a protrusion with a shape different from that illustrated in FIG. 6.

The capless filler 1X may be provided with a protrusion 10C instead of the protrusions 10A and may have no limiting groove 11 (refer to FIG. 9). In one example, the protrusion 10C has a circular outer shape with a diameter smaller than that of the closure 8b and has a center that is off-centered in the down direction from the center of the closure 8b. The protrusion 10C is provided as a nozzle guide 12C having an outer surface that is inclined such that the protrusion amount of the protrusion 10C from the base 8 decreases downward, that is, toward the direction away from the supported part 9. The outer circumferential part of the protrusion 10C has a gently curved outer surface, and the protrusion amount of the outer circumferential part of the protrusion 10C from the base 8 decreases toward the outer circumference.

The protrusion 10C (nozzle guide 12C) is also used as the target "T" due to the same reason as for the protrusion 10A.

As in the case of using the protrusions 10A, using the protrusion 10C instead of the protrusions 10A enables a fueling person to easily push the protrusion 10C by the fuel nozzle 200 while aiming the target "T" in fueling. In one example, the protrusion 10C is formed into a target shape that is easy to visually perceive as a target "T" and thereby more clearly shows the pushing position "P". In addition, a position distant from the supported part 9 tends to be pushed in starting fueling. Thus, operation time in fueling can be reduced. Moreover, the protrusion 10C, which has the gently curved outer surface at the outer circumferential part, makes the fuel nozzle 200 easily come over the protrusion 10C when the fuel nozzle 200 pushes a part on an outer side of the target "T". Thus, the possibility in which the fuel nozzle 200 pushes the protrusion 10C is enhanced.

Next, a capless filler 1Y of the third embodiment will be described (refer to FIGS. 10 to 14).

The capless filler 1Y described below differs from the above-described capless filler 1 in the shape of the flap. In consideration of this, the parts different from those of the capless filler 1 will be described in detail. The other parts are denoted by the same reference symbols as those used for equivalent components of the capless filler 1, and descriptions thereof are omitted.

Figure 10:
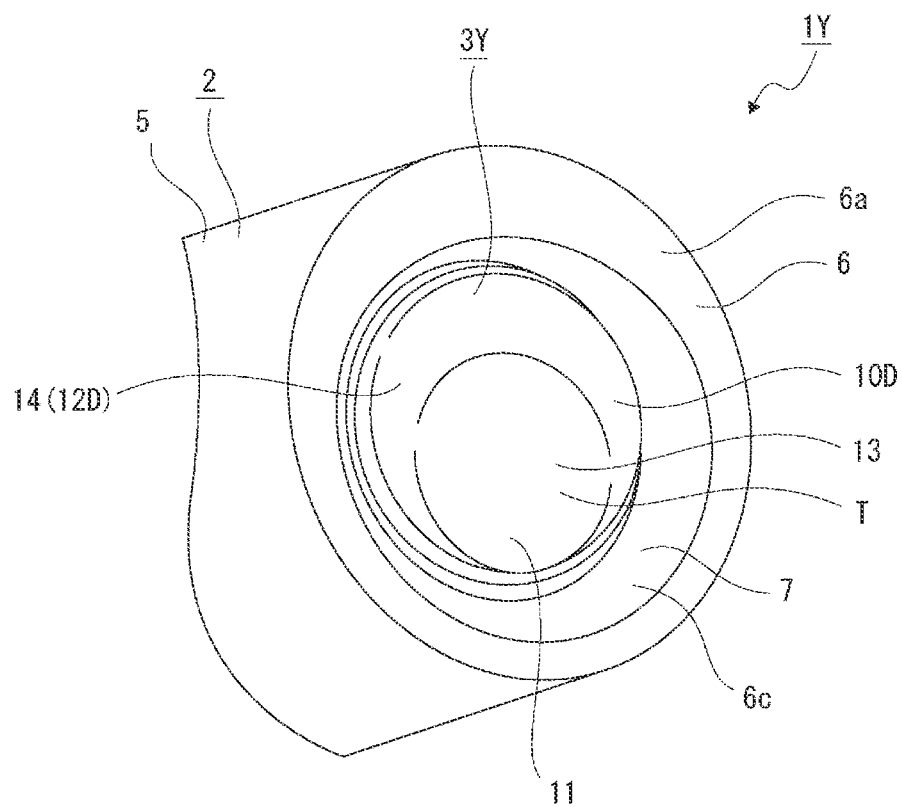
FIG. 10 is a perspective view of an embodiment of the capless filler of the disclosure, which is also illustrated in FIGS. 11 to 14.
Figure 11:
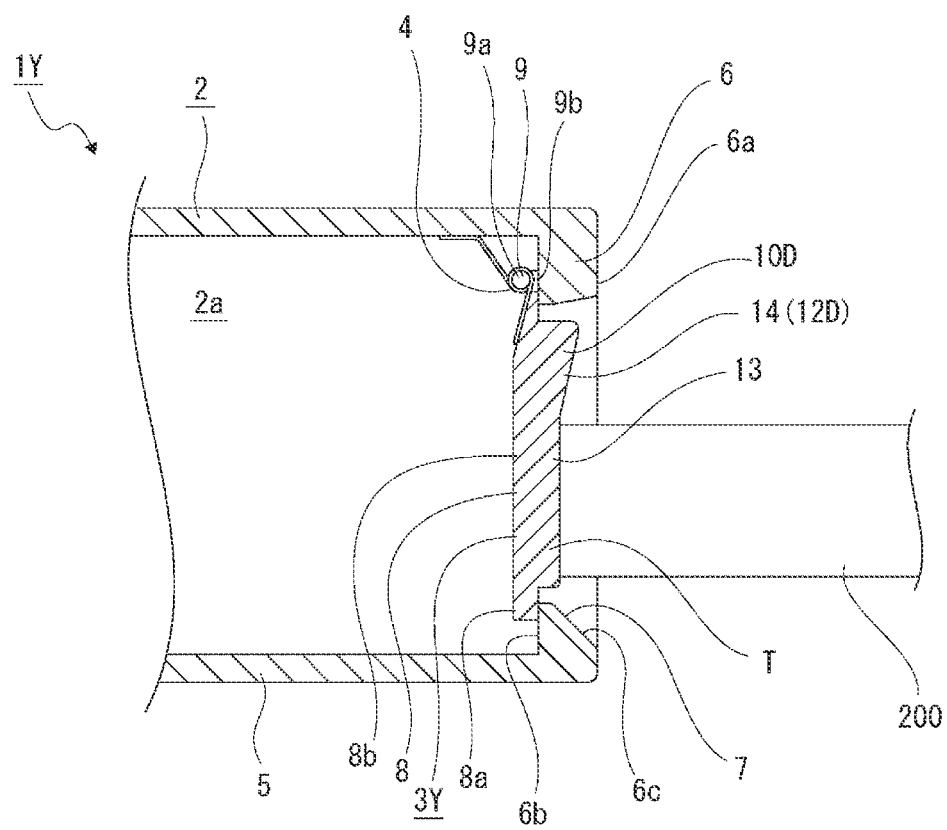
FIG. 11 is a sectional view of the capless filler in FIG. 10.

A flap 3Y of the capless filler 1Y is provided with a protrusion 10D (refer to FIG. 10). The protrusion 10D protrudes outward from almost the whole closure 8b and includes an inside part 13 and an outside part 14.

The inside part 13 is formed into a circular shape with approximately the same diameter as an outer diameter of the fuel nozzle 200, for example. The center of the inside part 13 is off-centered in the down direction from the center of the closure 8b, and a lower end of the inside part 13 coincides with a lower end of the protrusion 10D. The protrusion amount of the inside part 13 from the base 8 is constant (refer to FIG. 11).

The outside part 14 extends to an outer side of a part other than a lower end part of the inside part 13. The protrusion amount of the outside part 14 from the base 8 is greater than the protrusion amount of the inside part 13 from the base 8. The outside part 14 has an outer surface that is inclined such that the protrusion amount of the outer surface from the base 8 decreases toward the inside part 13. Thus, the outside part 14 has the greatest protrusion amount from the base 8, at the outer circumference. The outside part 14 is provided as a nozzle guide 12D.

In the capless filler 1Y, the outside part 14 is provided outward of the circular-shaped inside part 13, whereby the inside part 13 has a shape that is easy to perceive as a target. Thus, the inside part 13 is easily perceived by a fueling person, as a part to be pushed by the fuel nozzle 200, and the inside part 13 is used as the target "T" that shows the pushing position "P" of the fuel nozzle 200.

In the capless filler 1Y, the inside part 13 is provided as the target "T", whereby the pushing position "P" is clearly shown. Thus, a fueling person can easily push the inside part 13 by the fuel nozzle 200 while aiming the target "T", in fueling. When the fuel nozzle 200 pushes the outside part 14 in starting fueling, the fuel nozzle 200 is guided to the inside part 13 while sliding on the outside part 14. Thus, a fueling person can easily handle the fuel nozzle 200, resulting in improvement in fueling operation.

Moreover, the protrusion amount of the inside part 13 from the base 8 is constant, and therefore, the whole head surface of the fuel nozzle 200 easily comes into contact with the inside part 13, and the flap 3Y is stably and reliably pushed by the fuel nozzle 200, in starting fueling. The inside part 13 is positioned inside the tilted outside part 14, whereby the outside part 14 limits movement in the outer circumferential direction of the fuel nozzle 200, and the fuel nozzle 200 does not easily come off from the inside part 13. Thus, the possibility that the inside part 13, which is distant from the supported part 9, is pushed by the fuel nozzle 200, is increased, and the flap 3Y can be turned in the first direction by a smaller force.

Although an example of forming the inside part 13 and the outside part 14 to the protrusion 10D is described above, the outside part 14 may protrude from the base 8, whereas a part inside the outside part 14 of the closure 8b may be provided as the inside part. This reduces the volume of the protrusion part and enables reduction in manufacturing cost of the flap 3Y.

Figure 12:
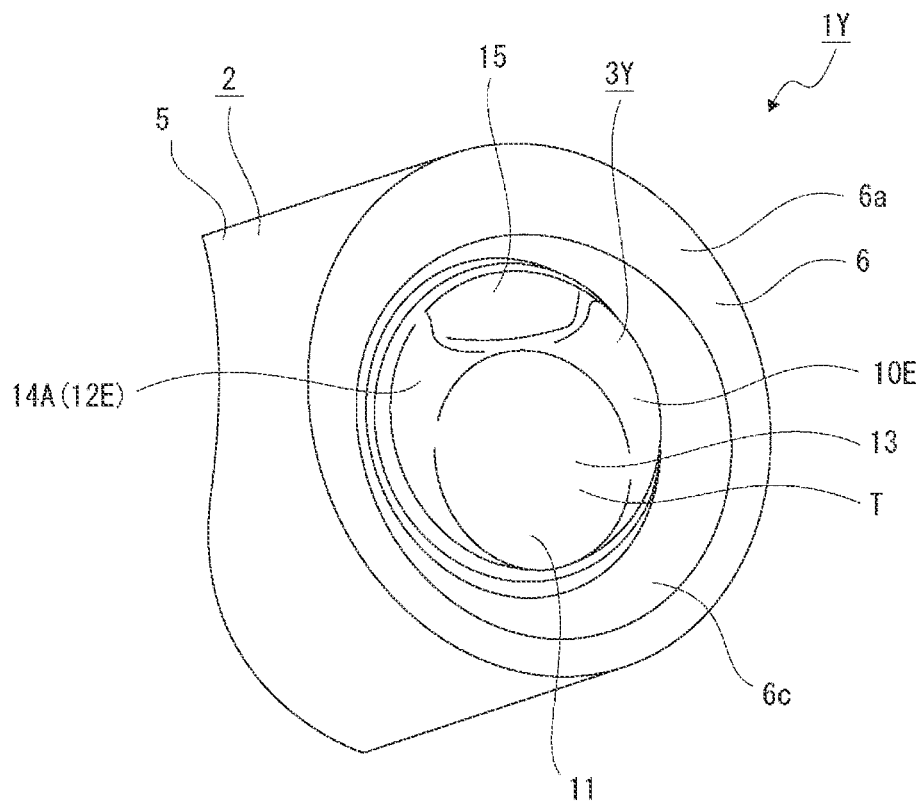
FIG. 12 is a perspective view illustrating a capless filler provided with a nozzle guide having a recess.

The capless filler 1Y may be provided with a protrusion 10E that has a recess, instead of the protrusion 10D (refer to FIG. 12).

The protrusion 10E protrude outward from almost the whole closure 8b and includes an inside part 13 and an outside part 14A.

The outside part 14A has a recess 15 at an upper end part, and the recess 15 opens outward and upward. The part other than the recess 15 of the outside part 14A has the same shape and dimensions as the outside part 14 and is used as a nozzle guide 12E.

In the protrusion 10E, the inside part 13 is used as the target "T" in the same manner as in the protrusion 10D.

As in the case of using the protrusion 10D, using the protrusion 10E instead of the protrusion 10D enables a fueling person to easily push the inside part 13 by the fuel nozzle 200 while aiming the target "T" in fueling. In addition, the outside part 14A guides the fuel nozzle 200 to the inside part 13. Thus, a fueling person can easily handle the fuel nozzle 200, resulting in improvement in fueling operation. Moreover, the outside part 14A limits movement to an outer side of the inside part 13 of the fuel nozzle 200.

Figure 13:
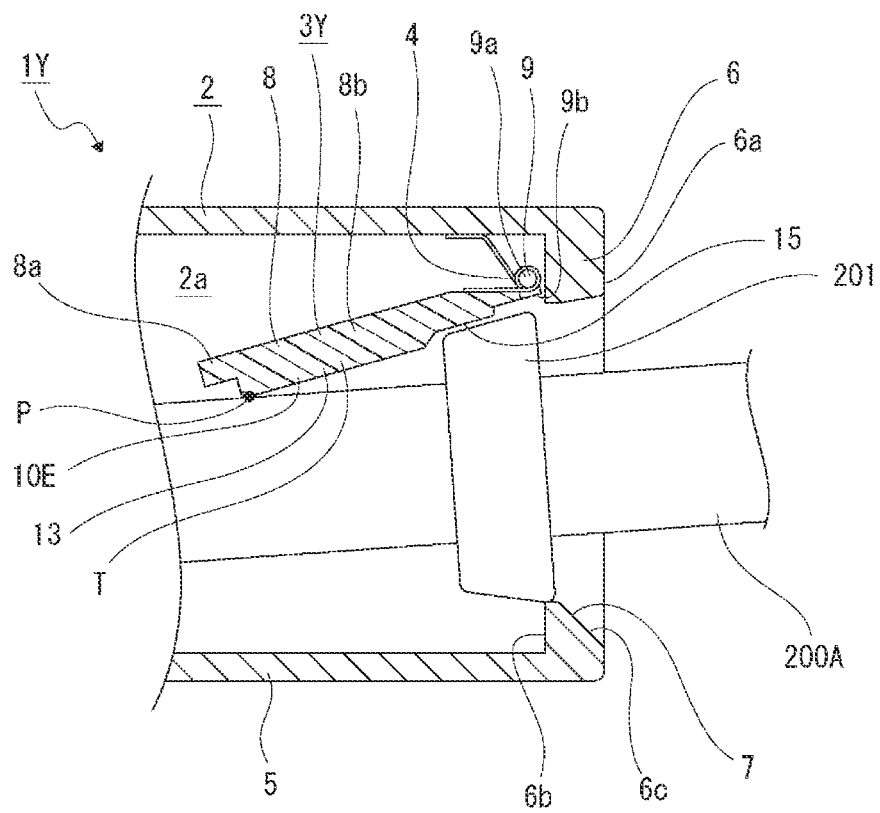
FIG. 13 is a sectional view of the capless filler in FIG. 12.

In fueling a vehicle or the like, a fuel nozzle 200A that is provided with an outwardly extended flange 201 may be used instead of the fuel nozzle 200 (refer to FIG. 13).

In the capless filler 1Y, the flange 201 is positioned in the recess 15 when the fuel nozzle 200A pushes the protrusion 10E. Thus, the flange 201 of the fuel nozzle 200A does not interfere with the flap 3Y, whereby the fuel nozzle 200A can be inserted to an appropriate position in the insertion space 2a and can be reliably and suitably inserted into the fuel hole 7.

Figure 14:
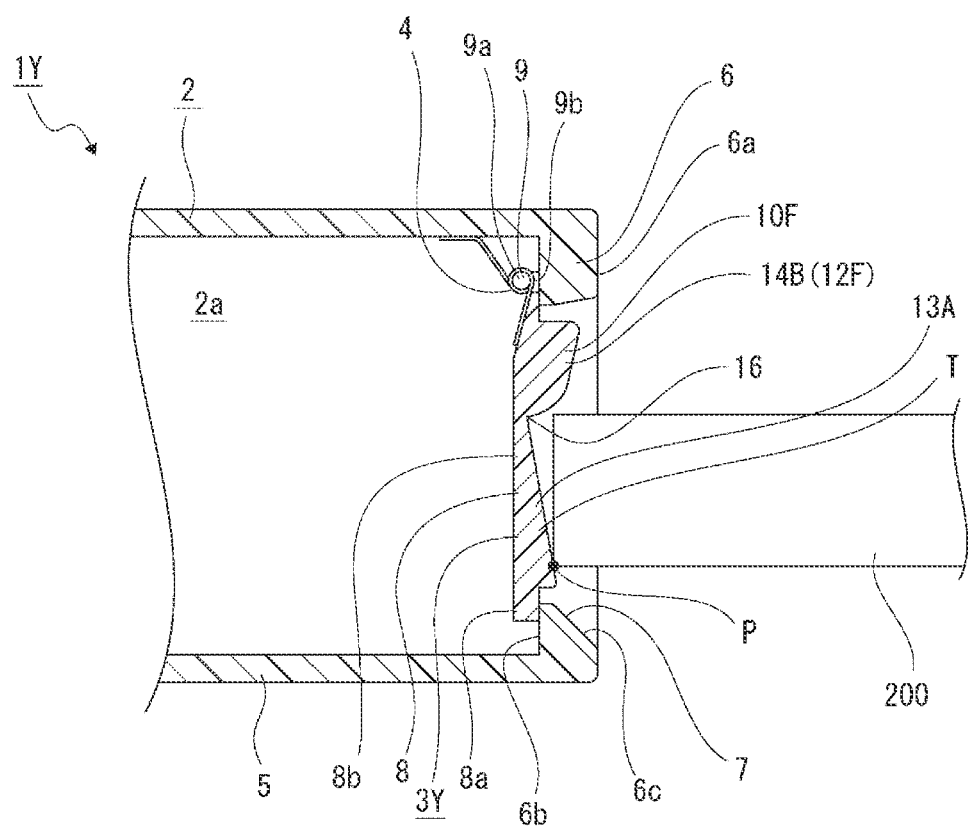
FIG. 14 is a sectional view illustrating another example of the nozzle guide having a protrusion.

The capless filler 1Y may be provided with, instead of the protrusion 10D, a protrusion 10F having an inside part 13A the protrusion amount of which from the base 8 varies (refer to FIG. 14).

The protrusion 10F protrudes outward from almost the whole closure 8b and includes an inside part 13A and an outside part 14B.

The outer shape of the inside part 13A has the same dimension as the inside part 13. The inside part 13A is inclined such that the protrusion amount of the inside part 13A from the base 8 decreases upward. A part other than an end part, on the inside part 13A side, of the outside part 14B has the same outer shape and dimensions as the outside part 14. The end part, on the inside part 13A side, of the outside part 14B has a gently curved outer surface. The protrusion amount of the end part, on the inside part 13A side, of the outside part 14B from the base 8 decreases toward the inside part 13A. The outside part 14B is provided as a nozzle guide 12F.

The inside part 13A is also used as the target "T" due to the same reason as for the inside part 13. In one example, in the protrusion 10F, the inside part 13A is tilted, and the outer surface of the end part, on the inside part 13A side, of the outside part 14B is formed into the gently curved surface. This shape makes it easy to emphasize a boundary line 16 between the inside part 13A and the outside part 14B, whereby the inside part 13A can be easily perceived as the target "T", which shows the pushing position "P" of the fuel nozzle 200.

As in the case of using the protrusion 10D, using the protrusion 10F instead of the protrusion 10D enables a fueling person to easily push the inside part 13A by the fuel nozzle 200 while aiming the target "T" in fueling. In addition, the outside part 14B guides the fuel nozzle 200 to the inside part 13A. Thus, a fueling person can easily handle the fuel nozzle 200, resulting in improvement in fueling operation. Moreover, the outside part 14B limits movement to an outer side of the inside part 13A of the fuel nozzle 200.

The protrusion amount of the inside part 13A from the base 8 is the greatest at a lower end part, whereby the inside part 13A tends to be pushed by a lower end part of the fuel nozzle 200 in starting fueling. Thus, a part that is distant from the supported part 9 of the flap 3 is easily pushed by the fuel nozzle 200 (200A) from the start of fueling, and the flap 3Y can be turned in the first direction by a smaller force.

Although an example of providing the outside part 14B to the protrusion 10F is described above, the recess 15 may be provided in the same manner as in the outside part 14A, also when the protrusion 10F is used.

The invention claimed is:
1. A capless filler comprising:
a housing having a fuel hole configured to receive a fuel nozzle;
a flap comprising
an end part,
a supported part that is provided at the end part and that is supported by the housing,
a base that extends to the supported part, and
a protrusion that protrudes from the base, the flap being configured to be turned on a fulcrum at the supported part between an open position for opening the fuel hole and a closed position for closing the fuel hole; and
a biasing spring configured to bias the flap in a direction from the open position to the closed position, the biasing spring being configured to push the base against an opening rim of the fuel hole at the closed position, wherein
the flap is configured to be turned in a direction from the closed position to the open position in response to the protrusion being pushed by the fuel nozzle,
at least a part of the protrusion is provided as two nozzle guides configured to guide the fuel nozzle in a direction away from the supported part when the flap is turned,
the two nozzle guides are provided separately from each other,
a limiting groove is provided between the two nozzle guides, and
the limiting groove is configured to limit movement of the fuel nozzle in a direction in which the two nozzle guides are arranged.

2. The capless filler according to claim 1, wherein at least a part of the two nozzle guides is provided as a target that shows a pushing position of the fuel nozzle.
3. The capless filler according to claim 1, wherein
the protrusion is provided with a target that shows a pushing position of the fuel nozzle, and
the two nozzle guides are configured to guide the fuel nozzle to the target.
4. A capless filler comprising:
a housing having a fuel hole configured to receive a fuel nozzle;
a flap comprising:
an end part,
a supported part that is provided at the end part and that is supported by the housing,
a base that extends to the supported part, and
a protrusion that protrudes from the base, the flap being configured to be turned on a fulcrum at the supported part between an open position for opening the fuel hole and a closed position for closing the fuel hole; and
a biasing spring configured to bias the flap in a direction from the open position to the closed position, the biasing spring being configured to push the base against an opening rim of the fuel hole at the closed position, wherein
the flap is configured to be turned in a direction from the closed position to the open position in response to the protrusion being pushed by the fuel nozzle, and
the protrusion comprises an outside part and an inside part, wherein
the outside part comprises a recess as a nozzle guide configured to guide the fuel nozzle in a direction away from the supported part when the flap is turned, the recess being in contact with a flange of the fuel nozzle to prevent the flange from interference with the fuel nozzle at the open position, and
the inside part protrudes outwardly relative to the outside part such that the protrusion amount of the inside part is greater than the protrusion amount of the outside part.
5. A capless filler comprising:
a housing having a fuel hole configured to receive a fuel nozzle;
a flap comprising:
an end part,
a supported part that is provided at the end part and that is supported by the housing,
a base that extends to the supported part, and
a protrusion that protrudes from the base, the flap being configured to be turned on a fulcrum at the supported part between an open position for opening the fuel hole and a closed position for closing the fuel hole; and
a biasing spring configured to bias the flap in a direction from the open position to the closed position, the biasing spring being configured to push the base against an opening rim of the fuel hole at the closed position, wherein
the flap is configured to be turned in a direction from the closed position to the open position in response to the protrusion being pushed by the fuel nozzle, and
the protrusion comprises an outside part and an inside part, wherein
the outside part is configured to guide the fuel nozzle in a direction away from the supported part when the flap is turned; and the inside part is inclined towards the outside part such that the protrusion amount of the inside part decreases towards the outside part.

6. The capless filler according to claim 5, wherein the outside part has a curved outer surface.

* * * * *